United States Patent Office 2,921,095
Patented Jan. 12, 1960

2,921,095

PHOSPHINOBORINE COMPOUNDS AND THEIR PREPARATION

Anton B. Burg, Los Angeles, and Ross I. Wagner, Montebello, Calif.

No Drawing. Application June 17, 1957
Serial No. 666,204

13 Claims. (Cl. 260—606.5)

This application, which is a continuation-in-part of our copending application, Serial No. 446,147, filed July 27, 1954, relates in general to phosphinoborines and their production. A divisional application of Serial No. 446,147, which is identified as Serial No. 754,914, filed August 14, 1958, describes and claims compounds similar to those claimed herein. More particularly, this invention relates to phosphinoborines wherein the hydrogen atoms on the phosphorus are both replaced with certain aliphatic radicals and wherein the hydrogen atoms on the boron are replaced in part or whole by aliphatic radicals.

The materials ordinarily used in the preparation of polymers and plastic materials are organic in nature and may display unsatisfactory chemical and thermal stability under conditions of specialized usage.

It is therefore an object of this invention to provide a group of basically inorganic polymers having unusual chemical and thermal stability.

A further object of this invention is to provide a method for synthesizing phosphinoborine polymers.

Ancillary objects and advantages of this invention, if not specifically set out, will become apparent during the course of the detailed description which follows.

Broadly, it has been found that polymeric phosphinoborine rings may be prepared which are usually stable having the general formula:

$$[RR'PBR''R''']_n$$

wherein R and R' are any alkyl groups of less than 13 carbon atoms and wherein R'' and R''' are hydrogen or lower alkyl substituents, at least one of the two symbols R'' and R''' representing an aliphatic substituent. In the formula $n$ is a small integer indicative of the degree of polymerization, and in the greatest portion of the reaction product secured, $n$ is 3 or 4. Lesser amounts of higher polymers are obtained in the product.

The most elementary of the compounds included within the scope of this invention, the trimeric polymer of dimethylphosphinomethylborine, has a melting point of about 120° C. The compound dimethylphosphinodimethylborine, a solid at room temperatures, has a melting point of about 333–334° C. Hydrocarbon chains of increasing length bonded to the phosphorus atom generally will cause the polymer secured to exhibit properties more nearly akin to those of the hydrocarbons from which the chains are derived. Thus, chain lengths of as high as 12 carbon atoms on the phosphorus ordinarily cause the phosphinoborine product to become more hydrocarbon-like than, for example, dimethylphosphinomethylborine. In other words, the hydrocarbon chains on the phosphorus may be of such length that the phosphorus-boron moiety is fairly limited in its effect upon the property of the polymer secured.

By contrast, however, increasing numbers of carbons on the boron atom ordinarily increase to some extent the melting point of the polymer obtained. Note the comparison of dimethylphosphinomethylborine and di-methylphosphinodimethylborine above. Thus, a compound having a fairly extensive hydrocarbon chain on the phosphorus and a more or less correspondingly long carbon chain on the boron will be, in a sense, "counterbalanced" such that the phosphinoborine polymer in certain respects approaches in properties the simple phosphinoborine polymers of the dimethylphosphinodimethylborine type.

Where the processes of this invention are followed, the product will be primarily the trimer, and to a lesser extent, the tetramer and higher polymers; compounds having individual [RR'PBR''R'''] units joined one to the next, each individual unit being joined through the phosphorus and boron to an adjacent boron or phosphorus atom at either end to form a ring. The trimer, as just indicated, will ordinarily represent the largest portion of the reaction product and has the structural formula:

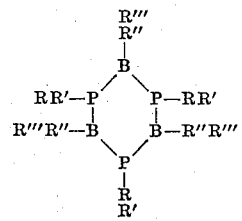

These products can be prepared through a variety of methods. A secondary phosphine borine having at least one hydrogen atom on the B may be pyrolyzed whereby to split off one hydrogen atom each from both the phosphorus and the boron atom with the production of the ring phosphinoborine. This, however, is not the preferred preparation method for reasons appearing below. Also, a phosphine haloborine may be dehalogenated to yield a ring phosphinoborine.

More particularly, the preparation of these phosphinoborines can be accomplished in several ways. In one, a secondary phosphine borine is pyrolyzed to effect a loss of one hydrogen each from both the phosphorus and boron atoms. The reaction proceeds to some extent in accordance with the equation:

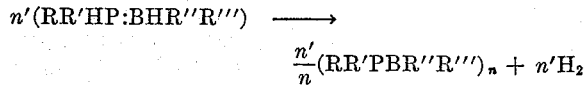

wherein $n'$ indicates the number of molecules present initially and $n$ indicates the number of individual phosphinoborine units joined together to form the ring compound.

This method, involving pyrolysis of the corresponding phosphine borine, is not preferred, however, for the preparation of the phosphoinoborine ring polymers of this invention. This is because of the fact that when a phosphine borine having one or more aliphatic radicals on the boron atom is pyrolyzed, disproportionation occurs changing the phosphine borine initially present to dialkylphosphine trialkylborines and dialkylphosphine monoalkylborines at temperatures below those required for the loss of hydrogen from the RR'HP:BHR''R''' reactant. Thus, for example, where the compound $(CH_3)_2HP:BH(CH_3)_2$ is pyrolyzed, quantities of $(CH_3)_2HP:B(CH_3)_3$ and $(CH_3)_2HP:BH_2CH_3$ are obtained at temperatures below those required for the obtaining of the phosphinoborine by the loss of hydrogen from the dimethylphosphine dimethylborine. Further, a certain amount of further disproportionation whereby $(CH_3)_2PBH_2$ and $(CH_3)_2PB(CH_3)_2$ units are formed is observed. And, since the formation of some $B(CH_3)_3$ in the early stages of the process results in partial suppression of the disproportionation at later stages, it is found that a mixture of polymers and copolymers of which $(CH_3)_2PBHCH_3$ units predominate with some $$(CH_3)_2PB(CH_3)_2$$

units and still lesser quantities of $(CH_3)_2PBH_2$ units present is obtained.

The most significant disproportionation reaction may be represented generally by the following:

$$2RR'HP:BHR''R''' \longrightarrow$$
$$RR'HP:BH_2R'' + RR'HP:BR''R'''_2$$
$$+ RR'HP:BH_2R''' + RR'HP:BR''_2R'''$$

followed by a loss of $H_2$ to form phosphinoborines:

$$n'RR'HP:BH_2R'' \longrightarrow \frac{n'}{n}(RR'PBHR'')_n + n'H_2$$

and $$n'RR'HP:BH_2R''' \longrightarrow \frac{n'}{n}(RR'PBHR''')_n + n'H_2$$

The pyrolysis reaction thus is a method by which a mixture of polymers, some of which may not be the desired material, is obtained.

Pyrolysis may be carried out in a refluxing solvent of high boiling point such as n-butyl ether or triethylene glycol dimethyl ether. However, where pyrolysis is to be used, the preferred method of pyrolyzing phosphine borines does not necessitate the use of a solvent. Refluxing a phosphine borine itself in an inert atmosphere is an extremely simple way to remove the hydrogen. No product contamination with the solvent is observed where this method is used. Refluxing until no further hydrogen evolves generally takes a period of about 30 to 60 minutes as contrasted with periods measured in hours where a solvent is employed. It is advantageous to pass the $H_2$ evolved by the reaction into a mercury bubbler—thus affording a ready method of ascertaining when the reaction is complete. Alternatively, the pyrolysis may be carried out in a flow system.

In the alternative, and preferred, method, the dehalogenation of phosphine haloborines, the reaction proceeds:

$$n'(RR'HPBR''R'''X) \longrightarrow$$
$$\frac{n'}{n}(RR'PBR''R''')_n + n'HX$$

wherein X designates a halogen and each of the other symbols is used in the manner set out above. Thus, the by-product HX is a hydrohalogen acid. This is prevented from displacing the weaker acid function represented by the boron atom and the radicals (excepting the P) attached thereto from the phosphine borine addition compound to form a phosphonium salt by providing a quantity of a tertiary amine in the reaction vessel. This reacts with the hydrohalogen and so removes it from the reaction mixture as a substituted ammonium salt. As the reaction is not carried out at reflux temperatures, a wide variety of solvents, such as any of the ethers, may be employed. For example, diethyl ether is readily available and is recommended for use in the process. Another suitable solvent is benzene.

The practice of this invention both with respect to performing the processes and securing the products thereof will become apparent from the following examples, which are set forth by way of illustration. In certain of the examples, the quantities of materials condensed are listed in cubic centimeters. This is in reference to gas at standard temperature and pressure and the quantities may be converted to millimoles by dividing by 22.4.

EXAMPLE I

An efficient preparation of the trimer of $$(CH_3)_2PB(CH_3)_2$$

was achieved through the reaction of $(CH_3)_2PH$ with $(CH_3)_2BBr$ in the presence of triethylamine. 80.3 cc. each of $(CH_3)_2PH$ and $(CH_3)_2BBr$ were brought together in 10 ml. of benzene and treated with 80.3 cc. of triethylamine, to form a precipitate of $(C_2H_5)_3NHBr$. The benzene was evaporated in vacuo and replaced by ether; then, after filtration, the product was recrystallized from methanol in a yield of 30%. Further use of the some method indicated that it would be feasible to use ether as the solvent throughout the process, filtering off the salt and crystallizing the desired product.

EXAMPLE II

Since the yields of the by-product triethylammonium bromide were usually near 95% in the tests described above, the reaction was reinvestigated to determine the degree of polymerization of the remaining dimethylphosphinodimethylborine trimer. In the first such test 107.8 cc. of $(CH_3)_2BBr$, 108.0 cc. of $(CH_3)_2PH$ and 107.8 cc. of $(C_2H_5)_3N$ were condensed at $-196°$ C. in order listed into a tube containing 10 ml. of 2,3-dimethylbutane. 0.8366 g. $(C_2H_5)_3NHBr$, or a yield of 95.5% with a reaction time of two hours, was obtained. The yield of dimethylphosphinodimethylborine trimer was 12.1% of the calculated. To allow thorough mixing, the tube was warmed to 25° C. after each reagent was added. The tube, connected through a sintered glass filter to another tube, was sealed. The reaction was allowed to proceed at room temperature and the by-product, triethylammonium bromide was filtered out and washed three times by distilling the solvent back into it. At the conclusion of the reaction time, which included the filtering and washing operation, the solvent was removed from the filtrate, the tube was opened and the product was recrystallized from methanol.

EXAMPLE III

In fashion similar to that set forth in Example I above and in the sequence and at the temperatures listed there, 99.1 cc. of $(CH_3)_2BBr$, 99.1 cc. of $(CH_3)_2PH$ and the 100.0 cc. of $(C_2H_5)_3N$ were condensed at $-196°$ C. into a tube containing 10 ml. ether. A 74.6% yield of $(C_2H_5)_3NHBr$ or 0.6002 g. was secured over a reaction time of six hours. The yield of dimethylphosphinodimethylborine trimer was 42.2%.

EXAMPLE IV

In fashion similar to that set out in Examples II and III above, 99.2 cc. of $(CH_3)_2BBr$, 99.3 cc. of $(CH_3)_2PH$ and 99.0 cc. of $(C_2H_5)_3N$ were condensed at $-196°$ C. in 10 ml. of ether. The reaction time on this occasion was 180 hours, the reaction times of Examples III and IV differing by a factor of 30. A yield of 69.6% $[(CH_3)_2PB(CH_3)_2]_3$ was secured. The yield of triethylammonium bromide was 94.5%. The data of Examples II–IV suggest that monomeric $(CH_3)_2PB(CH_3)_2$ was formed initially and slowly trimerized. In the examples set forth above, when yields of the trimeric product were high, a much smaller quantity of dimethylphosphine was evolved from a methanol solution of the reaction mixture. This is consistent with the observation that monomeric phosphinoborines are easily methanolyzed—this observation having been made earlier by applicants.

EXAMPLE V

Pyrolysis of di-methylphosphine di-methylborine, $(CH_3)_2HP:BH(CH_3)_2$ in a sealed flask, and in an inert atmosphere at 250° C. yielded an inhomogeneous material principally composed of $[(CH_3)_2PBH(CH_3)]_n$ with lesser amounts of $[(CH_3)_2PB(CH_3)_2]_n$. The volatility of the mixture suggested that the trimeric compounds were predominant.

The stoichiometry for further runs wherein a typical phosphine haloborine is dehydrohalogenated to form a product consisting primarily of the trimer with lesser amounts of the tetramer and higher polymers is set forth in Table 1 below.

Table 1.—Dehydrohalogenation

| Ex. No. | Phosphine Haloborine | Grams | Tertiary Amine | Grams | Solvent | Phosphinoborine Trimer Product |
|---|---|---|---|---|---|---|
| VI | $(C_5H_{11})_2HP:Br(CH_3)_2$ | 38.7 | Triethylamine | 15.2 | Diethyl ether | $[(C_5H_{11})_2PB(CH_3)_2]_3$ |
| VII | $(CH_3)_2HP:BBr(C_2H_5)_2$ | 21.1 | do | 10.1 | do | $[(CH_3)_2PB(C_2H_5)_2]_3$ |
| VIII | $\{i\text{-}C_3H_7(CH_3)HP:BBr(CH_3)_2$ <br> $CH_3(C_2H_5)HP:BBr(CH_3)_2\}$ | 21.2 <br> 19.6 | do | 20.2 | do | $\{[i\text{-}C_3H_7(CH_3)PB(CH_3)_2]n[CH_3(C_2H_5)PB(CH_3)_2]m$. <br> where $m$ and $n$ are integers totalling 3. |
| IX | $(n\text{-}C_4H_9)_2HP:BCl(CH_3)_2$ | 12.0 | do | 5.0 | do | $[(n\text{-}C_4H_9)_2PB(CH_3)_2]_3$ |
| X | $C_8H_{17}(CH_3)HP:BCl(C_2H_5)_2$ | 24.9 | Dimethylaniline | 12.1 | do | $[C_8H_{17}(CH_3)PB(C_2H_5)_2]_3$ |
| XI | $n\text{-}C_{12}H_{25}(CH_3)HP:BBr(CH_3)_2$ | 32.3 | Triethylamine | 12.1 | do | $[n\text{-}C_{12}H_{25}(CH_3)PB(CH_3)_2]_3$ |
| XII | $(n\text{-}C_4H_9)_2HP:BBr(n\text{-}C_4H_9)_2$ | 11.9 | do | 3.0 | Benzene | $[(n\text{-}C_4H_9)_2PB(n\text{-}C_4H_9)_2]_3$ |

Information regarding further runs using the pyrolysis method of this invention whereby a product may be obtained consisting predominantly of the trimer and containing lesser amounts of the tretramer and higher polymers is set forth in Table 2 below.

Table 2.—Pyrolysis

| Example No. | Phosphine Borine | Pyrolysis Temp., °C. | Phosphinoborine |
|---|---|---|---|
| XIII | $(i\text{-}C_3H_7)_2HP:BH(CH_3)_2$ | 250 | $[(i\text{-}C_3H_7)_2PBHCH_3]_3$ |
| XIV | $CH_3(C_2H_5)HP:BH(C_6H_{13})_2$ | 150–250 | $[CH_3(C_2H_5)PB(C_6H_{13})H]_3$ |

While phosphine borine materials are used in the examples set forth above, it is to be understood that they may be prepared in accordance with the procedures set forth in our copending application, Serial No. 446,148, filed July 27, 1954, now abandoned, titled, "Phosphine Borine Compounds and Their Preparation," and application Serial No. 666,214, filed June 17, 1957, entitled "Phosphine Borine Compounds and Their Preparation," as well as in the publication entitled "Chemistry of P–B Bonding: The Phosphinoborines and Their Polymers," J.A.C.S. 75, pp. 3872–3877, August 1953.

The ring phosphinoborine polymers of this invention which are liquids are useful as hydraulic fluids where high temperatures are encountered because of their aforementioned thermal and chemical stability. Where the materials secured are of relatively short aliphatic chain length, they are generally solids and accordingly find utility as dielectrics in applications where high temperatures are commonly encountered. They are unusually resistant to thermal decomposition and to oxidative and hydrolytic attack. The simplest of these polymers have been shown to resist hydrolysis for periods to ten days with HCl at 300° C. Also, certain of these materials show very little thermal instability even at 350° C. or more.

As can be seen from the examples set forth above, a wide variety of ring polymeric products may be obtained by either the pyrolysis reaction of this invention, or alternatively, by the preferred dehydrohalogenation of corresponding phosphine borines. Products secured are di-substituted phosphinoborines having aliphatic chains substituted for the various hydrogen atoms on the phosphorus; the boron atoms of the phosphine borines are either mono- or di-substituted with any of a wide variety of aliphatic chains being suitable for attachment thereto.

Obviously, other modifications and variations of this invention as hereinbefore set forth may be made without departing from the spirit and scope thereof and, accordingly, only those limitations should be imposed as are indicated in the appended claims. For example, the invention is not limited to polymers of individual phosphinoborines, but as, set forth in the examples, includes copolymers between different of the compounds, the method of preparation of such materials being that set forth above for individual phosphinoborines excepting that mixtures of precursors are prepared at the outset.

We claim:

1. A phosphinoborine ring of the formula:

$$[RR'PBR''R''']_n$$

wherein R and R' are alkyl groups of less than 13 carbon atoms, and wherein R'' and R''' are selected from the class consisting of hydrogen and lower alkyl, at least one of said R'' and R''' being a lower alkyl group, and wherein $n$ is an integer from 3 to 4 indicative of the degree of polymerization.

2. A phosphinoborine ring of the formula $$[(CH_3)_2PBR''R''']_n$$

wherein R'' and R''' are selected from the class consisting of hydrogen and lower alkyl, at least one of said R'' and R''' being a lower alkyl group, and wherein $n$ is an integer of from 3 to 4 indicative of the degree of polymerization.

3. A phosphinoborine ring of the formula $$[(C_2H_5)_2PBR''R''']_n$$

wherein R'' and R''' are selected from the class consisting of hydrogen and lower alkyl, at least one of said R'' and R''' being a lower alkyl group, and wherein $n$ is an integer of from 3 to 4 indicative of the degree of polymerization.

4. A phosphinoborine ring of the formula $$[RR'PB(CH_3)_2]_n$$

wherein R and R' are alkyl groups of less than 13 carbon atoms and wherein $n$ is an integer of from 3 to 4 indicative of the degree of polymerization.

5. A phosphinoborine ring of the formula $$[RR'PB(C_2H_5)_2]_n$$

wherein R and R' are alkyl groups of less than 13 carbon atoms and wherein $n$ is an integer of from 3 to 4 indicative of the degree of polymerization.

6. A phosphinoborine ring of the formula $$[(C_4H_9)_2PBR''R''']_n$$

wherein R'' and R''' are selected from the class consisting of hydrogen and lower alkyl, at least one of said R″ and R‴ being a lower alkyl group, and wherein $n$ is an integer of from 3 to 4 indicative of the degree of polymerization.

7. A phosphinoborine ring of the formula $$[R(CH_3)PBR''R''']_n$$

wherein R is an alkyl group of less than 13 carbon atoms and wherein R″ and R‴ are selected from the class consisting of hydrogen and lower alkyl, at least one of said R″ and R‴ being a lower alkyl group and wherein $n$ is an integer of from 3 to 4 indicative of the degree of polymerization.

8. A phosphinoborine ring of the formula $$[RR'PBR''(CH_3)]_n$$

wherein R and R′ are alkyl groups of less than 13 carbon atoms, wherein R″ is selected from the class consisting of hydrogen and lower alkyl, and wherein $n$ is an integer of from 3 to 4 indicative of the degree of polymerization.

9. The trimeric polymer of dimethylphosphinodimethylborine.

10. The trimeric polymer of dimethylphosphinomethylborine.

11. The trimeric polymer of dimethylphosphinodiethylborine.

12. The trimeric polymer of dibutylphosphinodibutylborine.

13. The trimeric copolymer $$[CH_3(i\text{-}C_3H_7)PB(CH_3)_2]_n[CH_3(C_2H_5)PB(CH_3)_2]_m$$

wherein $n$ and $m$ are integers from 1 to 3 and wherein the sum of $m$ and $n$ is 3.

References Cited in the file of this patent

Burg et al.: "American Chemical Society Journal," vol. 75, pp. 3872–7 (1953).

Hewitt et al.: "Journal Chemical Society" (London), pp. 530–4 (1953), publ. February 1953, received in Patent Office Library Apr. 1, 1953.

UNITED STATES PATENT OFFICE

CERTIFICATE OF CORRECTION

Patent No. 2,921,095                          January 12, 1960

Anton B. Burg et al.

It is hereby certified that error appears in the above numbered patent requiring correction and that the said Letters Patent should read as corrected below.

In the grant, lines 1 and 2, for "Anton B. Burg, of Los Angeles, and Ross I. Wagner, of Montebello, California," read -- Anton B. Burg, of Los Angeles, and Ross I. Wagner, of Montebello, California, assignors, by mesne assignments, to American Potash & Chemical Corporation, a corporation of Delaware, --; line 11, for "Anton B. Burg and Ross I. Wagner, their heirs" read -- American Potash & Chemical Corporation, its successors --; in the heading to the printed specification, lines 4 and 5, for "Anton B. Burg, Los Angeles, and Ross I. Wagner, Montebello, Calif." read -- Anton B. Burg, Los Angeles, and Ross I. Wagner, Montebello, Calif., assignors, by mesne assignments, to American Potash & Chemical Corporation, a corporation of Delaware --.

Signed and sealed this 5th day of July 1960.

(SEAL)
Attest:

KARL H. AXLINE
Attesting Officer

ROBERT C. WATSON
Commissioner of Patents